Oct. 13, 1959     D. L. RICHTER     2,908,528
UTILITY AUTOMOTIVE VEHICLE
Filed Sept. 21, 1955     6 Sheets-Sheet 1
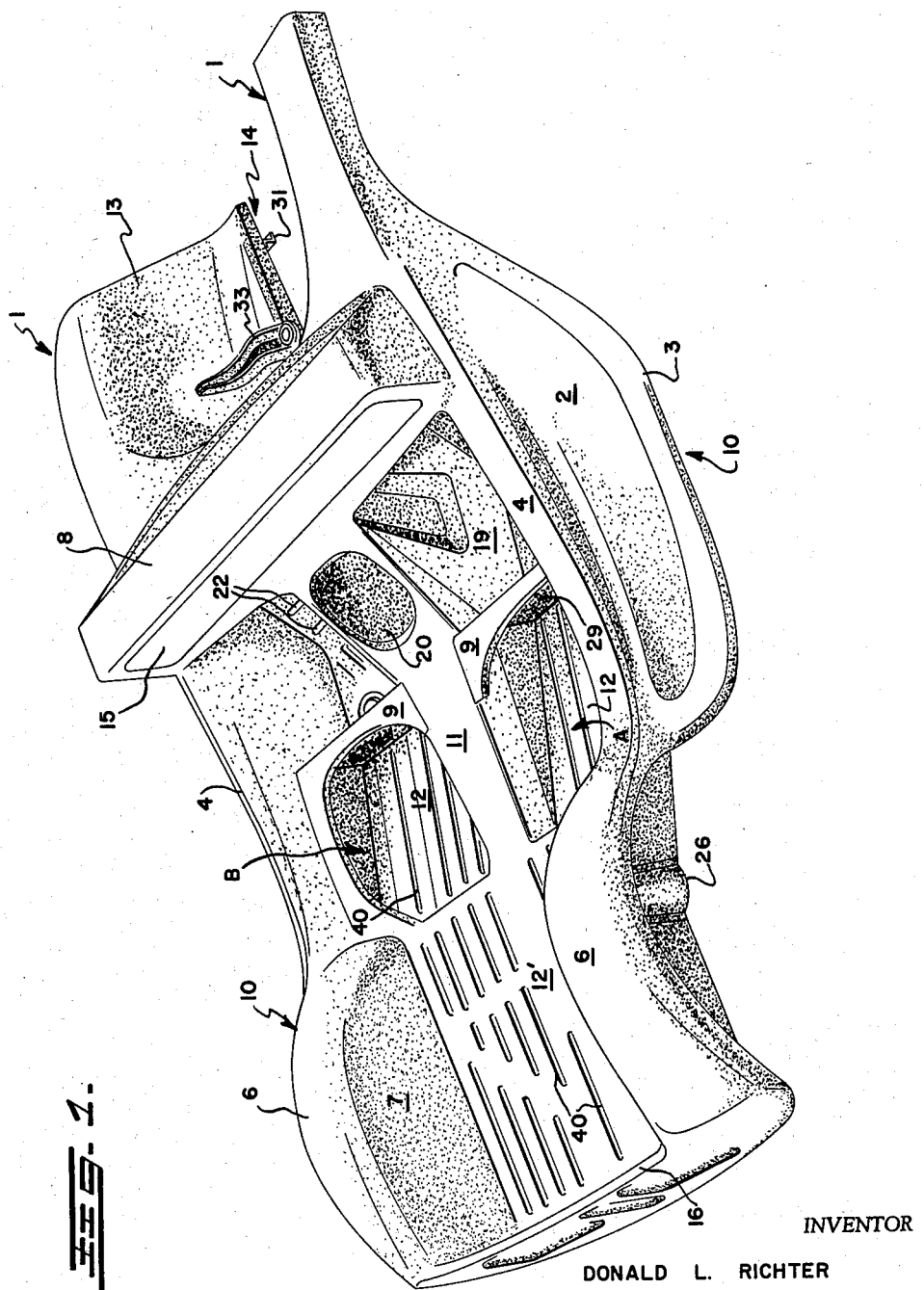
INVENTOR
DONALD L. RICHTER
BY *James E. Toomey*
ATTORNEY

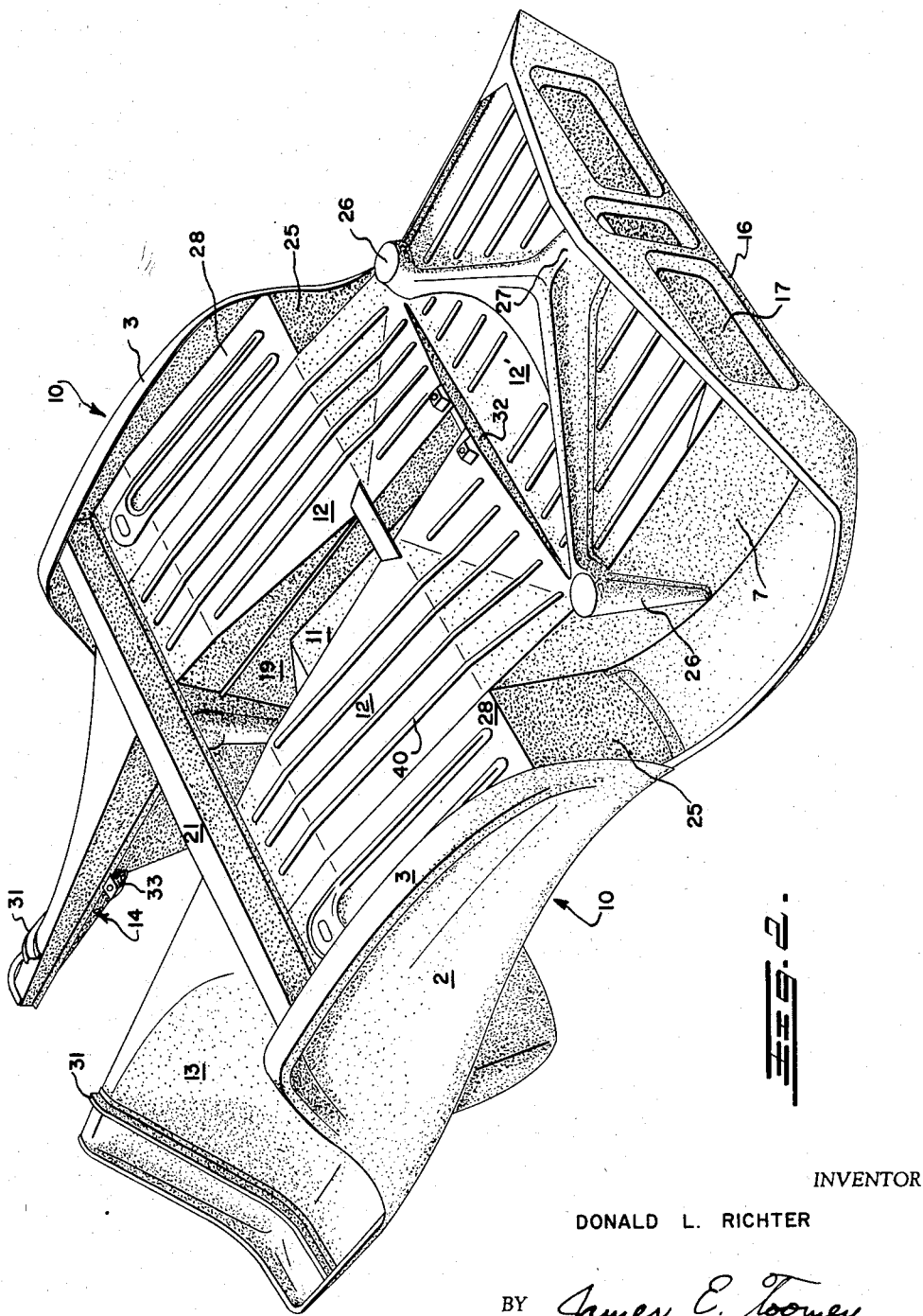

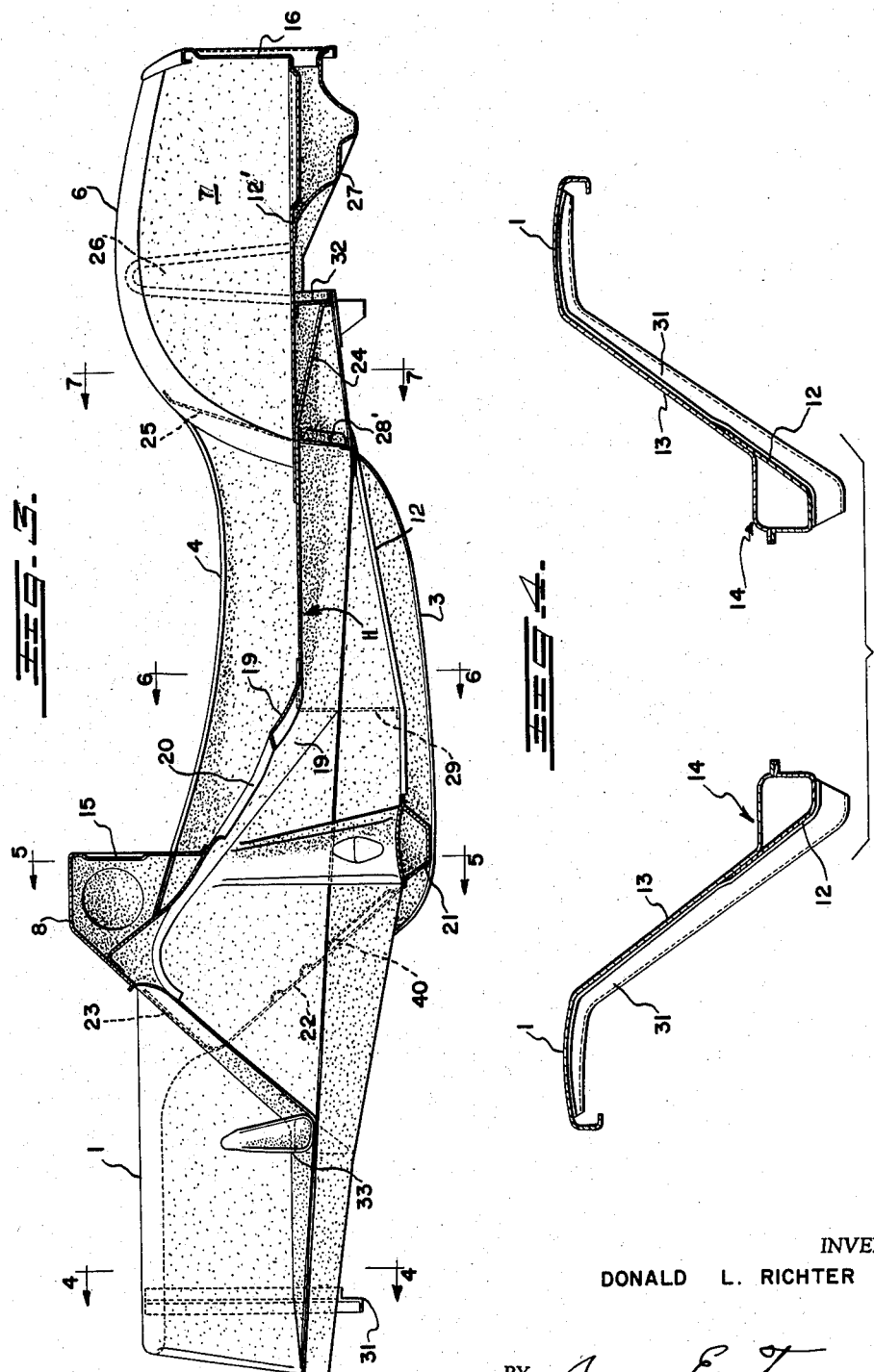

Oct. 13, 1959  D. L. RICHTER  2,908,528
UTILITY AUTOMOTIVE VEHICLE
Filed Sept. 21, 1955  6 Sheets-Sheet 4
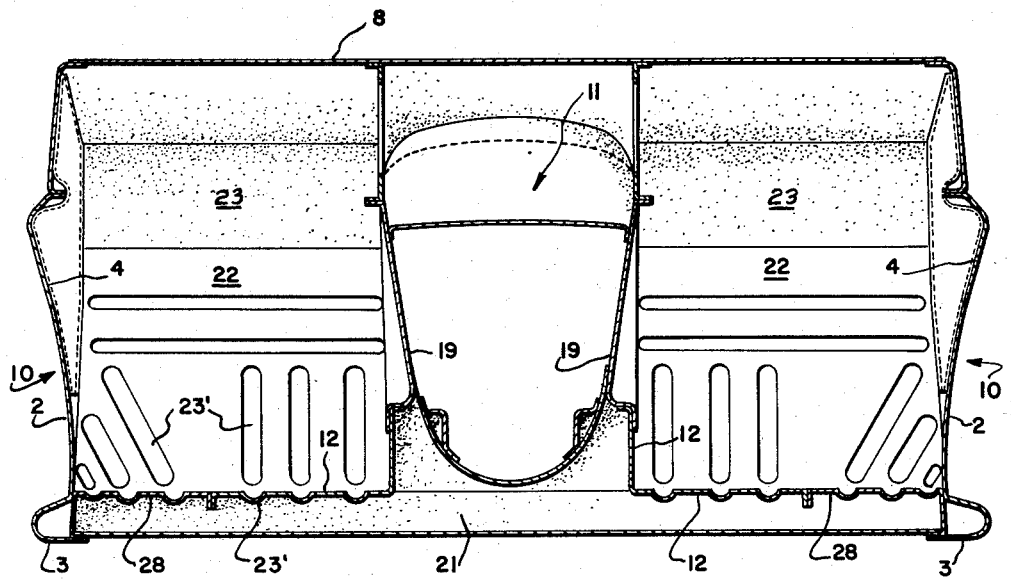
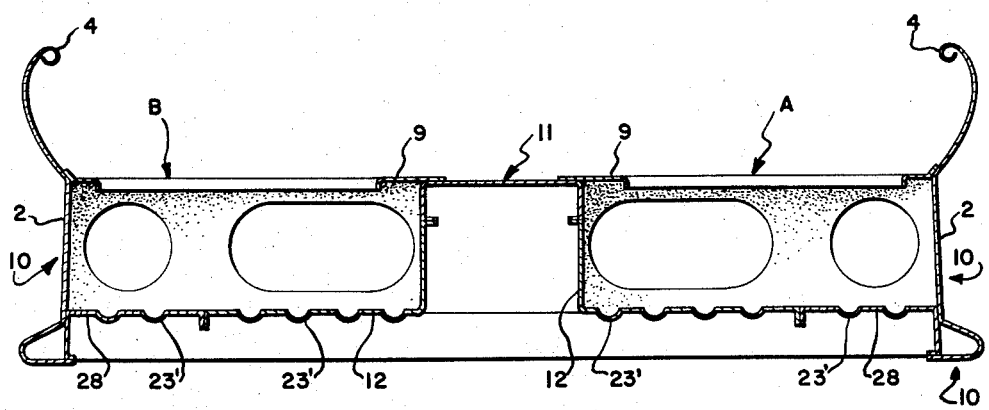
INVENTOR
DONALD L. RICHTER
BY *James E. Toomey*
ATTORNEY Oct. 13, 1959  D. L. RICHTER  2,908,528
UTILITY AUTOMOTIVE VEHICLE
Filed Sept. 21, 1955  6 Sheets-Sheet 5

INVENTOR
DONALD L. RICHTER

BY James E. Toomey
ATTORNEY

Oct. 13, 1959     D. L. RICHTER     2,908,528
UTILITY AUTOMOTIVE VEHICLE
Filed Sept. 21, 1955     6 Sheets-Sheet 6
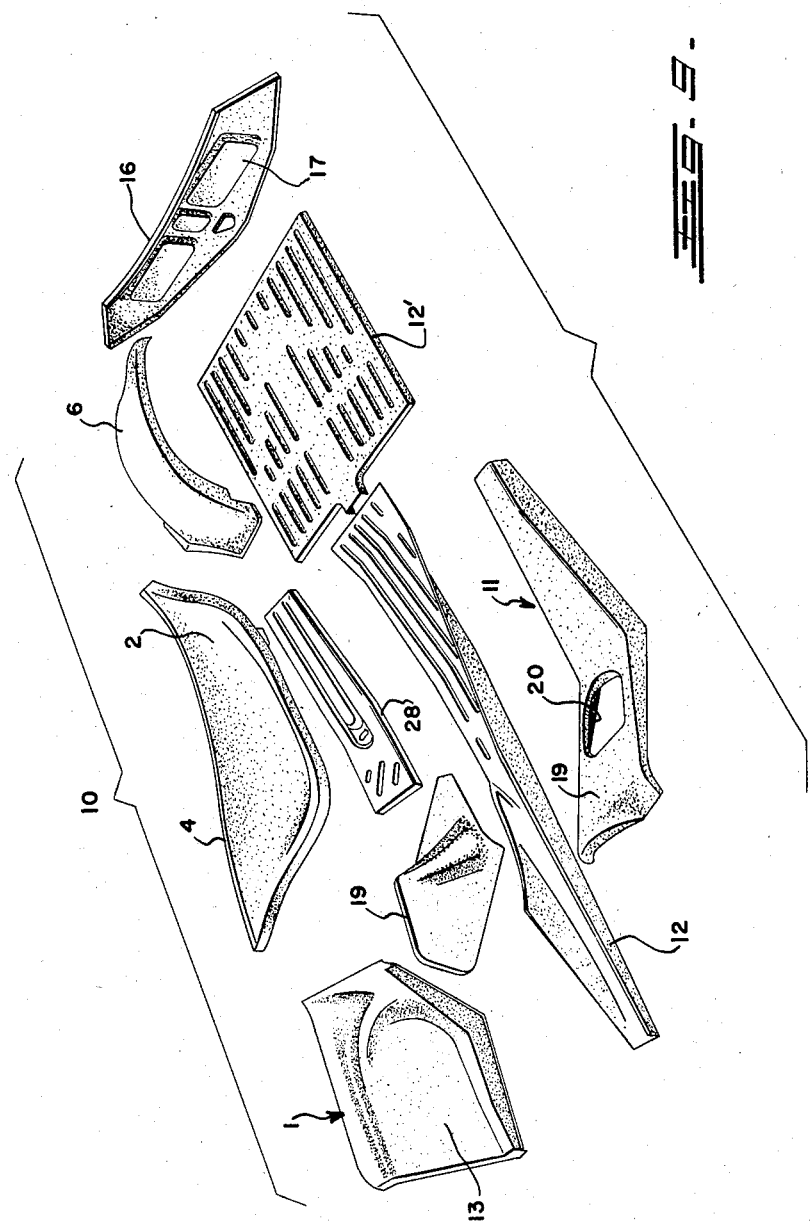
INVENTOR
DONALD L. RICHTER
BY *James E. Tooney*
ATTORNEY

United States Patent Office 2,908,528
Patented Oct. 13, 1959

2,908,528

UTILITY AUTOMOTIVE VEHICLE

Donald L. Richter, Oakland, Calif., assignor to Kaiser Aluminum & Chemical Corporation, Oakland, Calif., a corporation of Delaware Application September 21, 1955, Serial No. 535,593

10 Claims. (Cl. 296—28)

This invention relates to automotive vehicles. Specifically, the instant invention relates to automotive vehicles of general purpose design and to a novel unitary body shell construction therefor.

More particularly, the invention relates to a body shell construction peculiarly adapted for fabrication of sheet components of a light metal, for example, aluminum, where all steering, suspension and drive components of the completed vehicle may be directly attached to the shell construction, without the necessity for any intermediate or separate reinforcing chassis or frame.

Heretofore, vehicles of the type considered as being all purpose utility vehicles have been extensively used both by the military forces and by the civilian population. Such vehicles are generally designed so as to facilitate their use as a personnel as well as a cargo carrier and are peculiarly adapted for performing their function under a variety of conditions. For example, such vehicles and in particular those provided with four wheel drive suspension and transmission components have found extensive use as reconaissance vehicles, troop transports and the like by the military forces. Such vehicles are also used as power trucks, prospectors' carry-alls, farm vehicles and the like by civilian purchasers.

In accordance with the usual automotive practice such vehicles have been, in the past, constructed along conventional lines, utilizing a frame or chassis for receiving engine, suspension components, transmission and drive components such as are necessary to form a self-propelled motor vehicle and a body, i.e. the cargo and passenger confining and supporting element, separately constructed and attached to the frame or chassis by suitable bolts or the like.

In view of the use for which such vehicles are designed, all components, body and chassis have been of extremely rugged and inevitably heavy construction. All of these factors go to produce a vehicle, the total weight of which is wholly disproportionate to its weight when loaded and to its load carrying capacity. This excessive weight has proved to be an even more significant factor insofar as military use is concerned, particularly in view of the presently contemplated extensive use of such vehicles in air drop maneuvers, where weight and the ability of aircraft to carry it are the prime factors in the success of such operations.

Excessive weight also has its detrimental effects on other phases of utility of such a vehicle. For example, weight of the vehicle radically affects performance, cruising range, tire wear, total gross loads legally carried, maneuverability, and a myriad of other factors, none the least of which is the ability of such a vehicle to traverse swamps, hills and other difficult terrain during off-the-highway use.

Accordingly, an object of the invention is to provide a general purpose vehicle utilizing an integrally formed unitary frameless construction which is rugged and extremely light in weight.

Another object of this invention is to provide a novel body shell for a utility vehicle comprised of components so designed and fastened together that the components may be made of light weight metals without any noticeable sacrifice in the load carrying characteristics of the body shell.

A further object of the invention is to provide a general purpose vehicle utilizing the principles of stressed skin fabrication wherein the components utilized are constructed of light sheet metal.

Still an additional object of the invention is to provide a body shell for a utility vehicle wherein the various drive, engine suspension and steering components are in a sense, "hung" from the shell without the utilization of a separate supporting frame of any kind.

An additional object of the invention is to produce a utility vehicle incorporating a chassis-less unitary body construction wherein the body is fabricated from aluminum sheet metal components all united to form an integral unity by any suitable fastening means.

Another object of the invention is to produce a body shell for a general purpose vehicle which is rugged and light in weight, wherein the lightweight of the vehicle contributes materially in making the vehicle adaptable for airborne operations and to performance requirements not ordinarily available from the engine drive components with which the shell would be provided.

These and other objects within the contemplation of the instant invention will become more apparent from an inspection of the drawings, wherein:

Figure 1 is a perspective view of the complete frameless body shell as seen from above and to the rear;

Figure 2 is a perspective view of the complete frameless body shell disclosed in Figure 1 as seen from below and to the rear;

Figure 3 is a side sectional view of the body shell shown in Figure 1 when taken substantially along the longitudinal center line of the shell;

Figure 4 is a sectional view when taken along line 4—4 of Figure 3;

Figure 5 is a sectional view when taken along the line 5—5 of Figure 3;

Figure 6 is a sectional view when taken along the line 6—6 of Figure 3, with parts removed for the sake of clarity;

Figure 9 is a partial exploded view of some of the readily fabricated sheet components and indicates at least one manner in which the elements can be joined together.

Figure 7:
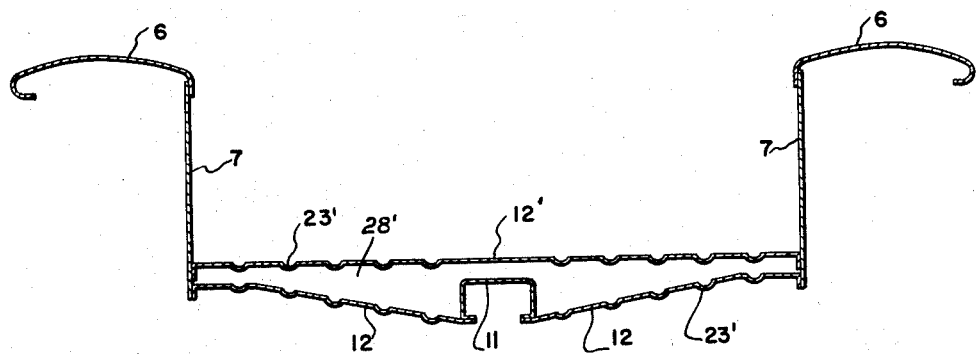
Figure 7 is a sectional view of the body shell of the instant vehicle construction when taken along the line 7—7 of Figure 3, with parts removed for the sake of clarity.
Figure 8:
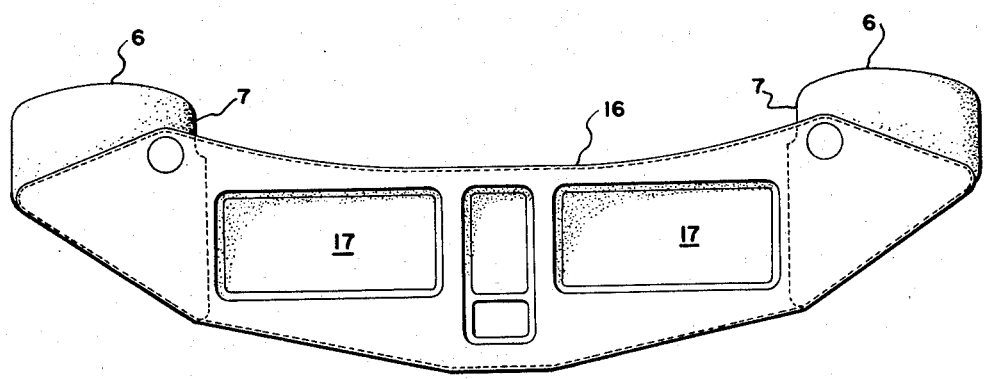
Figure 8 is a rear elevation of the body shell construction shown in Figure 2.

Considering in particular Figure 1, it may be seen that the body shell of the instant invention is a complete integral unit which may, as will become apparent, be formed of simple, easily handled sheet metal sections. These sections may be joined together to form the integral construction by any known means. When aluminum is the base material such conventional means would include welding, continuous or spot, metal stitching and/or riveting or any desired combination of these methods.

The resultant integral shell as shown comprises generally a spaced pair of side members 10, 10 including integral fender portions 1 and 6. Disposed between the side members 10 are generally flat cargo or load supporting floor portions 12, 12', floor extensions 28, a tail or end closure 16 and a box-like cowl 8 having an interiorly disposed instrument panel surface 15. A suitable tunnel-like midstructure 11 including a transmission yoke 19 extends longitudinally of and symmetrically about the center line of the shell. As may be seen from an inspection of Figure 1 the yoke 19 is provided with an access opening 20 which permits servicing, installation and removal of any desired transmission or gear box as may be incorporated in the completed vehicle.

A pair of floor extension members 9, 9 are fixed, one each between the respective side members 10, 10 and the tunnel-like structure 11. They serve as a continuation of the rear floor portion 12' as well as seat supports. These members act in conjunction with a riser 29 between the floor sections 12, 12' and the side walls of the drive tunnel 11 to form compartments A and B. The compartments thus formed may encompass such items as gas tanks, tools, etc., in the completed vehicle.

The front fender portions 1 of side members 10, 10 are provided with inwardly and downwardly directed sheet metal closure members 13 which terminate at their lower edges, in joined relation with elements 12 to form parallel engine mount rails 14.

The vertical web portions 2 of the side members 10 are further provided with a lower arcuate flange or rub rail 3 which is so designed along with a cross channel-shaped member 21 as to be the lowest portion of the body shell as well as the ground clearance determining factor of a completed vehicle. The purpose of this arrangement is to provide a sled-like assembly along the bottom of the entire vehicle which may slidingly contact the ground should excessively rough terrain be encountered. Thus, all mechanisms which might be damaged or become hung up on obstructions are safely stowed above these rub rails 3 and cross member 21.

Having considered the broad aspects of the vehicular shell disclosed in Figure 1, consideration will now be given to the construction details, which enable the unique construction, despite its extremely light weight, approximately one hundred pounds, to resist the destructive forces, which may be encountered during use of a completed vehicle.

The side members 10, including the vertical web 2 and the bottom and top marginal flanges 3 and 4, merge into fender portions 1 and 6 in integral smoothly configured curves. These members serve as parallel, laterally spaced and longitudinally disposed beam-like members.

These beams are interconnected by the member 21 which takes the form of a generally inverted channel-shaped cross member. This member along with the box-like cowl 8 and the transmission support yoke 19 forms a transverse girder between the side members 10, 10 thus effecting a laterally rigid twist-resistant structure.

Each rear fender portion 6 along with a pair of generally vertically disposed wheel well defining members 25 and merging fender and web portions 2 of side members 10 comprises a pair of box-like torque-resistant members resisting any loads which would tend to impart rotative or twisting stress on the rearmost portions of the beam-like members 10, 10.

In order to complete the body shell for its load carrying function a suitable flooring is provided. This flooring may be considered as being formed of longitudinally stepped sections 12 and 12' of which that portion 12' behind a riser 29 is uninterrupted in all horizontal directions. This floor section 12' is reinforced by a generally Y-shaped reinforcing member 27 having its base connected to a rear closure member 16, as may be clearly seen in Figures 2 and 3 of the drawings.

The forwardly divergent legs of the Y are in turn terminated at their intersection with the transverse web member 32 and at these points, along with semi-conical members 26, are fastened to vertical inside walls 7 of a back fender 6. As indicated particularly in Figure 3 the intersection of members 32, 26 and 12 along with floor 12' and vertical walls 7 of beam-like side members 10, provides a suitably strong point for the connection of such rear suspension members as will be used in a complete vehicle.

In addition to the reinforcement furnished by the Y-shaped member 27, that portion of the floor section 12' immediately adjacent to and behind riser 28' comprises a transverse stress resistant box member formed by a transverse vertical web member 32, riser 28', a portion of floor 12', and a generally flat sheet metal member 24 connected in part to the floor 12' and the transverse web member 32 at diametrically opposite corners. This double floor section including overlapped areas of floor portions 12 and 12' and the transverse members thus form another girder-like load-supporting means between the side members 10, 10.

The end closure member 16 is along with its connections with the rearmost portions of rear fender portions 6, walls 7 and floor 12' a rigid integral structure.

Considering now that portion of the floor ahead of the transverse riser 29, it may be seen that the floor sections 12, 12 are connected transversely by a generally inverted drive shaft housing or transmission tunnel channel 11. Additional elements 28 which are fastened integrally to the lateral side margins of floor section 12 serve to complete the entire floor from tunnel 11 outward laterally to side members 10, 10.

The forward edges of the tunnel interrupted floor sections 12, 12 are continued to form in part engine mount rails 14. Foot boards 22 are disposed at an angle thereto. These foot boards 22 as indicated in Figures 3 and 5 are provided with a rigid angular portion 23 which merges with and is connected in turn at its top edge to the box-like cowl member 8.

The innermost edges of the angularly disposed foot board portions 22 are merged with and connected to the forwardly and downwardly diverging walls of the transmission yoke 19.

Forward of cowl 8 are previously mentioned fender portions 1 of side members 10. The fender-like portions 1 are provided with downwardly directed converging wheel well forming panels 13 which terminate along the generally parallel, longitudinally disposed engine mount rails 14. These rails 14 in conjunction with elements 12 may advantageously form box sections.

The engine mount rails 14 along with the continuing floor sections 12, 12', and 28, foot boards 22, tunnel 11, yoke 19, and portions of web members 9, 28', 29 and 32 form in effect a continuous and uninterrupted longitudinal beam which along with the beam-like side members 10 produces for all intents and purposes a body shell comprising three longitudinally extending and longitudinally aligned beam members.

Of additional note is the fact that all of the extended flat surfaces, for example, floor portions or sections 12, 12', footboards 22, tail gate or closure 16 are additionally reinforced by the liberal use of ribs 40 and 23' or dished portions such as 17 in rear closure 16.

Wall members 13 may be further reinforced by Z-shaped stiffener sections 31 disposed in a generally vertical plane and if desired, suitable engine mount brackets 33 may be attached to rails 14 as a part of the complete shell.

It is to be noted that each and every component specifically referred to herein can be formed of readily fabricated sheet metal stock and all fastening such as by welding, stitching or riveting or any combination thereof may be readily performed. As may be seen from an inspection of Figure 9 of the drawing, each of the components which, when fabricated and attached to each other, forms the integral body shell, includes flanged or facing portions adapted to be welded, metal stitched or riveted to the proper mating face of each next adjacent component.

Thus, continuous floor section 12 including engine mount rail 14 would have a flange mating with a complementary flange on floor extension 28. The transmission tunnel 11 and transmission yoke 19 would be fabricated of separate units welded or otherwise fastened together to form the final assembly as shown in Figure 1.

Side beam members 10 could be readily fabricated of the elements 1, 2 and 6 as clearly shown in Figure 9, connected to each other by abutting flanges and suitable fastening means to form the smoothly curved assembly as shown in Figure 1.

The floor section 12' may be formed of a single sheet of light metal provided with flanges to abut flanges provided on those components with which it is interconnected.

It must also be appreciated that, where apropos, overlapped edges of adjacent sections may provide as suitable a joint as that obtained by the use of mating flange portions on the various elements.

Also it is believed that the full significance of the use of a single element in the structure including engine rails 14 and floor sections 12, 12 can be more readily seen from an inspection of Figure 9.

As shown in the drawings and described, the resultant shell is complete in and of itself and requires no separate frame and is in addition extremely light yet rugged in final integral form capable of accomplishing the advanges set forth in the objects specified.

What is claimed is:

1. A chassisless body shell for a utility vehicle comprising laterally spaced longitudinally extending continuous beam-like side members which include generally vertical web-like portions that merge in a continuous unbroken expanse into front and rear fender-like portions, said continuous beam-like members being joined in longitudinally complementary relation by a plurality of transversely extending girder-like members, one of said girder-like members including a generally box-shaped cowl and instrument panel supporting member fastened to the top of said continuous beam-like members adjacent the merging web-like and front fender-like portions of said continuous beam-like members, another of said girder-like members comprising a single laterally extending, generally channel-shaped element connected to said laterally spaced longitudinally extending beam-like members at the lowermost portion of the generally vertical web-like portions thereof, one of said fender-like portions of said continuous beam-like members including sloping inner sheet metal walls converging toward each other and terminating in spaced parallel marginal edges extending longitudinally of said shell, said edges being provided with reinforcing elements connected therewith to form parallel box-like engine support rails.

2. A frameless body shell for utility vehicles comprising laterally spaced, longitudinally extending, continuous beam-like side members including generally vertical web-like portions merging in a continuous unbroken expanse to front and rear fender-like portions, said continuous beam-like members being joined in longitudinal complementary relation by a plurality of transversely extending girder-like members one of said girder-like members comprising a generally box shaped cowl and instrument panel supporting member fastened to the top of said continuous beam-like members adjacent the merging web-like and front fender-like portions of said continuous beam-like members, another of said girder-like members comprising a single laterally extending generally channel shaped element connected to said laterally spaced, longitudinally extending beam-like members at the lowermost point of said vertical web-like portions, said shell further including a stepped generally horizontal and substantially continuous and flat sheet metal floor extending across the space between said laterally spaced continuous beam-like side members, that portion of said floor adjacent the rear fender-like portions including a Y-shaped reinforcing member having a base leg and forwardly diverging arms extending outwardly to points adjacent the merging web-like and rear fender-like portions of said continuous beam-like members.

3. A frameless body shell for a utility vehicle as defined in claim 2 wherein said flat floor includes integrally formed longitudinally extending reinforcing ribs.

4. A body shell for a utility vehicle as defined in claim 2 wherein said substantially continuous stepped sheet metal floor is interrupted midway between said laterally spaced continuous beam-like side members by a downwardly opening longitudinally extending transmission tunnel terminating at its rear portion in a vertical riser and at its forward portion in a downwardly and forwardly opening box-like yoke having downwardly sloping and forwardly diverging sides, said downwardly opening tunnel and said yoke respectively being continuously connected with said riser and the adjacent edges of said interrupted floor.

5. A body shell as defined in claim 4 wherein said interrupted floor further includes spaced foot board portions disposed to either side of said box-like yoke and extending from said interrupted floor upwardly in angular relation thereto, said foot board portions including further portions disposed at a generally right angle connected to said generally box-shaped cowl, said yoke and said continuous beam-like members; said foot board portions, said yoke, and said channel shaped element acting in combination as a single transverse girder between said continuous beam-like members.

6. A frameless body shell for a utility vehicle comprising laterally spaced, longitudinally extending, continuous beam-like side members including generally vertical web-like portions merging in a continuous unbroken expanse into front and rear fender-like portions, said continuous beam-like members being joined in a longitudinally complementary relation by a plurality of transversely extending girder-like members, one of said girder-like members including a generally box-shaped cowl and instrument panel supporting member fastened to the top of said continuous beam-like members adjacent the merging web-like and front fender-like portions of said members, another of said girder-like members comprising a single laterally extending generally channel-shaped element connected to said laterally spaced beam-like members at the lowermost portion of the said generally vertical web-like portions, said shell further including a stepped, generally horizontal floor extending across the space between the laterally spaced continuous beam-like side members, that portion of the floor adjacent the rear fender-like portions including a Y-shaped reinforcing member having a base leg and forwardly diverging arms extending outwardly to points adjacent the merging web-like and rear fender-like portions of said beam-like side members, said floor including a vertical riser adjacent its rearmost portion; that portion of said stepped floor forward of said riser being comprised in part, of vertically spaced sheet metal panels, said shell further including a transversely extending, vertically positioned enclosure member extending between and connected to said floor and, the rearmost end of said fender-like portions of said continuous beam-like side members; said riser, said vertically spaced sheet metal panels and said laterally spaced beam-like side members adjacent the rearmost portions cooperating to form a cross girder reinforcing said body shell.

7. A frameless body shell for a utility vehicle comprising laterally spaced, longitudinally extending beam-like side members, a central tunnel-like housing assembly, said side members including generally vertical web-like portions merging in a continuous unbroken expanse into front and rear fender portions, said central tunnel-like housing assembly being disposed intermediate of and parallel to said beam-like side members and terminating at longitudinally spaced front and rear torque resistant box beam-like assemblies positioned intermediate the ends of said beam-like side members, one of said assemblies comprising a transversely extending cowl having its terminal ends connected to said beam-like side members, another of said assemblies being comprised of a stepped rear floor structure including means reinforcing said floor structure to prevent lateral twisting thereof with respect to said cowl, said central tunnel-like housing assembly being connected to said cowl centrally thereof and including means projecting beyond said cowl and connected to the forward portions of said beam-like side members to form support rails for a power plant or the like, said rear floor structure being connected to the rearmost ends of said beam-like side members, floor panels connected between said central tunnel-like housing assembly, said cowl and said rear stepped floor structure and defining a unitary closed bottom frame and body unit and means for reinforcing said last mentioned floor panels.

8. A frameless body shell for utility vehicles as defined in claim 7 wherein said beam-like side members include flat surfaced lower edges projecting downwardly beyond said floor panels and defining a pair of longitudinally extending runners adapted to protect the underside of said body shell and associated parts from damage due to contact with unequal surface contours.

9. A frameless unitary body construction for a utility vehicle comprising laterally spaced, longitudinally extending side members, said members defining the front fenders, sides and rear fenders of said utility vehicle, a medially positioned tunnel-like assembly extending longitudinally between said side members, said tunnel-like assembly terminating in a forwardly extending portion defining with said side members a pair of laterally spaced power plant supports, a box-like cowl assembly extending transversely of said side members behind the front terminal portion of said medially disposed tunnel-like assembly, said cowl assembly being connected at its ends to said side members and medially of its ends to said tunnel-like assembly to define therewith a torque resistant structure, a vertical panel connected with the rearmost ends of said side members, a stepped floor assembly extending between said tunnel-like assembly, said cowl assembly, said side members and said vertical panel to define a load carrying chamber and means reinforcing the said stepped floor assembly; the floor area adjacent the rearmost ends of said side members and said vertical panel defining a torque resistant assembly to prevent twisting of the rearmost portions of said utility vehicle with respect to its foremost portions.

10. A chassisless body shell for a utility vehicle comprising laterally spaced and longitudinally extending continuous beam-like side members, said beam-like side members including generally vertical web-like portions which merge in a continuous unbroken expanse into front and rear fender-like portions, said continuous beam-like side members also being joined in longitudinally complementary relation by a plurality of transversely extending girder-like members, one of said girder-like members including a generally box-shaped cowl and instrument panel supporting member fastened to the top of said continuous beam-like members adjacent the merging web-like and front fender-like portions of said continuous beam-like members, another of said girder-like members comprising a transversely extending member connected to said laterally spaced longitudinally extending side members at a lower portion of the generally vertical web-like portions of the side members and a tunnel-like assembly positioned intermediate said beam-like side members and means including said girder-like members for interconnecting said tunnel-like assembly with said beam-like side members, said beam-like side members and tunnel-like assembly acting in concert to form longitudinally extending beams for said body shell.

References Cited in the file of this patent

UNITED STATES PATENTS

| | | |
|---|---|---|
| 2,254,497 | Schafer | Sept. 2, 1941 |
| 2,488,978 | Julien et al. | Nov. 22, 1949 |
| 2,525,339 | Chausson | Oct. 10, 1950 |
| 2,637,592 | Karlby | May 5, 1953 |
| 2,710,222 | Barenyi | June 7, 1955 |
| 2,719,044 | Walter | Sept. 27, 1955 |

FOREIGN PATENTS

| | | |
|---|---|---|
| 762,366 | France | Jan. 22, 1934 |
| 1,096,130 | France | Dec. 29, 1954 |

(Corresponding U.S. 2,814,524 filed Nov. 26, 1957)

| | | |
|---|---|---|
| 601,189 | Germany | Aug. 10, 1934 |
| 888,811 | Germany | Sept. 3, 1953 |
| 524,473 | Great Britain | Aug. 7, 1940 |
| 616,274 | Great Britain | Jan. 19, 1949 |
| 700,730 | Great Britain | Dec. 9, 1953 |
| 443,274 | Italy | Dec. 15, 1948 |